2,862,847

PESTICIDAL ARENETHIOSULFONATES

W E Craig and Chien-Pen Lo, Philadelphia, Pa., assignors to Rohm & Haas Company, Philadelphia, Pa., a corporation of Delaware No Drawing. Application May 4, 1956
Serial No. 582,649

8 Claims. (Cl. 167—30)

This invention concerns metallic arenethiosulfonates which are highly active fungicides and can be applied to plants to control fungal diseases. The effective metal salts are those of zinc, mercury, lead, and iron. The thiosulfonate may be not only the simple benzenethiosulfonate but also ring-substituted benzenethiosulfonates having as substituents chlorine and lower alkyl groups, particularly the various compounds having one or more methyl groups on the arene ring.

No worthwhile pesticidal properties have been reported for benzene- or toluenesulfonates or thiosulfonates, although of the latter the sodium, potassium, silver, and cadmium salts have been reported. We made sodium salts of benzenethiosulfonic, 4-chlorobenzenethiosulfonic, 4-methylbenzenethiosulfonic, and 3,4-dichlorobenzenethiosulfonic acids and found none of these exhibited fungicidal or insecticidal activity and were slightly phytotoxic. The potassium salts are likewise not fungicidal. We were surprised, therefore, to discover that some heavy metal benzenethiosulfonates exhibited rather effective fungicidal action, even at low concentrations. Thus, the zinc, mercury, lead, and iron salts showed good fungicidal activity below five parts per million, while nickel and calcium salts showed activity beginning at five to ten parts per million against some organisms. On the other hand, the copper salt begins to appear active only at relatively high concentrations, while the manganese, silver, and cadmium salts fail to be of any practical value as fungicides. It became clear that only a few specific metal salts of the benzene thiosulfonic acids are fungicidally useful, the zinc, mercury, lead, and iron salts.

These are made from a water-soluble sodium or potassium salt by reacting a solution of the alkali metal benzenethiosulfonate and a solution of a soluble salt of the selected metal. This metathetical reaction is usually carried out between 20° and 50° C. or more. The precipitate which forms is separated, washed, and dried. If desired, dispersing agents may be used to ensure that the precipitated product will remain in a finely divided, dispersed, non-agglomerated state, typical dispersants being the sodium salt of condensed naphthalene-formaldehyde sulfonate and the various forms of lignin sulfonates available for dispersing. Also, inert solids may be added as diluents and extenders during or after formation of these heavy metal salts.

Preparation of typical salts is shown in the following examples which are given by way of illustration and not by way of limitation. Parts are by weight unless otherwise designated.

Example 1

Sodium benzenethiosulfonate (40 parts) was dissolved in water (100 parts). To this was added at about 30° C. a solution of zinc chloride (14 parts) in water (100 parts). The solid which separated upon standing in the cold was filtered, washed with water, and dried in the air. There was obtained 24 parts of a yellow solid which gave the following analysis:

Calcd. for $C_{12}H_{10}O_4S_4Zn \cdot 3H_2O$: S, 27.4; Zn, 14.0. Found: S, 27.3; Zn, 14.2.

This compound was zinc benzenethiosulfonate.

Example 2

Sodium p-toluenethiosulfonate (86 parts) was dissolved in water (200 parts). This was added to a solution of zinc sulfate ($ZnSO_4 \cdot H_2O$), (37 parts) in water (200 parts) at about 25° C. The solid which separated upon standing in the cold was filtered, washed with water, and dried in the air. There was obtained 46 parts of a yellow solid, which corresponded in composition to zinc p-toluenethiosulfonate.

Analysis.—Calcd. for $C_{14}H_{14}O_4S_4Zn \cdot 3H_2O$: S, 26.0; Zn, 13.2. Found: S, 27.1; Zn, 13.2.

Example 3

Sodium p-chlorobenzenethiosulfonate (25 parts) was dissolved in water (100 ml.). To this was added a solution of zinc chloride (7 parts) in water (50 ml.). The mixture was stirred for one hour and chilled in the ice bath. The product was filtered, washed with water, and dried in the air. There was obtained 26 parts of a yellow solid, which corresponded in composition to zinc p-chlorobenzenethiosulfonate.

Analysis.—Calcd. for $C_{12}H_8Cl_2O_4S_4Zn \cdot 5H_2O$: S, 22.5; Zn, 11.5; $H_2O$, 15.8. Found: S, 20.6; Zn, 11.5; $H_2O$, 16.0.

Example 4

Sodium 3,4-dichlorobenzenethiosulfonate (27 parts) was used in place of the sodium p-chlorobenbenethiosulfonate in Example 3 above. There was obtained 23 parts of zinc 3,4-dichlorobenzenethiosulfonate as a yellow solid.

Example 5

A solution of mercuric chloride (68 parts) in water (300 parts) was added to a solution of sodium p-toluenethiosulfonate (105 parts) in water (300 parts). The mixture was stirred and chilled in an ice bath. The solid product was filtered, washed with water, and dried in the air. There was obtained 132 parts of a yellow solid which was mercuric p-toluenethiosulfonate.

Analysis.—Calcd. for $C_{14}H_{14}O_4S_4Hg \cdot 3H_2O$: S, 20.4; Hg, 32.0; $H_2O$, 8.6. Found: S, 20.5; Hg, 27.3; $H_2O$, 9.2.

Example 6

A solution of 19.6 parts of sodium benzenethiosulfonate was dissolved in water to make 100 parts by volume. This solution was slowly added with stirring to a solution of mercuric chloride (14 parts) in 100 parts of water which had been heated to 60° C. A precipitate formed with was increased when the reaction mixture was cooled to 10° C. The mixture was then filtered. The filter cake was washed with water and dried in air. There was obtained 24 parts of mercuric benzenethiosulfonate. By analysis the product as obtained contained 22.6% of sulfur and 37.4% of mercury (theory 23.4% and 36.7% respectively).

Example 7

A solution of lead acetate, $(CH_3COO)_2Pb \cdot 3H_2O$, (94.5 parts) in water (150 parts) was added to a solution of sodium p-toluenethiosulfonate (105 parts) in water (300 parts). The mixture was stirred and chilled in an ice bath. The product was filtered, washed with water, and dried in the air. There was obtained 129 parts of a gray solid which corresponded in composition to lead p-toluenethiosulfonate.

Analysis.—Calcd. for $C_{14}H_{14}O_4S_4Pb \cdot 4H_2O$: S, 19.6; Pb, 31.7; $H_2O$, 11.1. Found: S, 19.1; Pb, 31.4; $H_2O$, 13.2.

Example 8

A solution of ferric sulfate (33.3 parts) in water (300 parts) was added to a solution of sodium p-toluenethiosulfonate (105 parts) in water (300 parts). The mixture was stirred and chilled in an ice bath. The product was filtered, washed with water, and dried in the air. There was obtained 69 parts of an orange solid which corresponded in composition to ferric p-toluenethiosulfonate.

*Analysis.*—Calcd. for $C_{21}H_{21}O_6S_6Fe \cdot 2H_2O$: S, 29.4; Fe, 8.5; $H_2O$, 5.5. Found: S, 30.6; Fe, 7.8; $H_2O$, 5.6.

Example 9

A solution of 14 parts of ferric sulfate was made in 100 parts of water. This solution was slowly added with stirring to a solution of 39.2 parts of sodium benzenethiosulfonate in 200 parts of water at 30° C. An orange precipitate formed. The reaction mixture was cooled to 10° C. and filtered. The filter cake was well washed with water and dried at 50° C. The product corresponded by analysis to ferric benzenethiosulfonate. It contained 32.8% sulfur and 9.4% of iron (theory 33.4% and 9.7% respectively).

In the same way other benzenethiosulfonates of zinc, lead, mercury, or iron can be formed. The benzene ring may be substituted with chlorine or with one or more lower alkyl groups.

In standard fungitoxicity tests, in which spores are placed on coated plates treated with a dilute suspension of the compound under test and inhibition of germination after incubation is observed, it was found that zinc p-toluenethiosulfonate gave an $LD_{50}$ value at about 5 p. p. m. against *Stemphylium sarcinaeforme* and gave an $LD_{50}$ value at less than 5 p. p. m. against *Monilinia fructicola*. The same $LD_{50}$ values were obtained with zinc 4-chlorobenzenethiosulfonate, while zinc benzenethiosulfonate gave an $LD_{50}$ value of less than 5 p. p. m. against *Stemphylium sarcinaeforme* and of about 5 p. p. m. against *Monilinia fructicola*. Mercuric p-chloro- or p-methylbenzenethiosulfonates likewise give $LD_{50}$ values below 5 p. p. m. against *Stemphylium sarcinaeforme* and of about 50 p. p. m. against *Monilinia fructicola*. For the lead salts of benzenethiosulfonic, toluenethiosulfonic, xylenethiosulfonic, and chlorobenzenethiosulfonic acid $LD_{50}$ values are less than 5 p. p. m. for both of these fungi. The iron salts, whether ferrous or ferric, of these same acids have $LD_{50}$ values of about 10 p. p. m. against both of these fungi.

All of these compounds were sprayed at 0.1% and 0.01% in aqueous suspensions on young tomato plants without any signs of phytotoxicity. Tests at 1% were negative with all of the zinc, lead, mercury, and iron salts except in one test with zinc benzenethiosulfonate in which a few small spots appeared.

For application to plants of one of the above zinc, lead, mercury, or iron salts the salt is extended or dispersed in a carrier, which may be water or an inert solid. Suitable solids for extending such salts are talc, clay, pyrophyllite, diatomaceous earth, silica or other finely particled solid carriers. The dispersion of salt in a solid carrier may be applied as a dust, in which case the concentration of salt may be from 1% to 10%. The salts may also be dispersed in finely divided solids together with wetting and dispersing agents to provide wettable powders, usually containing 20% to 50% of the salt. The wettable powders can be used in aqueous sprays, usually at 0.05% to 5% of the salt. Again, a salt in finely particled form may be suspended in water, commonly with a wetting agent, at a concentration of 0.05% to about 2%.

A wettable powder was prepared from 75 parts of lead p-toluenethiosulfonate, 20 parts of a finely particled clay, two parts of a lignin sulfonate (sold under the trade mark Marasperse), and two parts of an alkylphenoxypolyethoxyethanol on magnesium carbonate. This was mixed with water at a concentration of two pounds per 100 gallons and applied to potato plants. The spray gave a significant reduction in late blight compared to control plots. A spray applied to apple trees, containing 2.66 pounds per 100 gallons, gave a strikingly better control of scab than sulfur applied at six pounds per 100 gallons. Trees sprayed with a concentration of 0.66 pound per 100 gallons showed a control of scab equal to six pounds per 100 gallons of wettable sulfur. Sprays at two pounds and 0.66 pound per 100 gallons applied to celery gave fairly good reduction in cercospora blight on celery.

A composition was prepared from 96 parts of ferric p-toluenethiosulfonate, two parts of the sodium salt of an olefin-maleic acid copolymer dispersing agent, and two parts of the mixture of an alkylphenoxypolyethoxyethanol and magnesium carbonate. This was applied in a spray at 1.5 pounds per 100 gallons to cantaloupe and cucumber plants to give elimination of powdery mildew and a significant reduction in downy mildew. It gave significant control of cercospora blight on celery and fair control of cercospora blight when used at one-half pound per 100 gallons. Applications at 1.5 pounds and at 0.5 pound per 100 gallons to potato plants gave fair control of late blight.

A composition was prepared from 96 parts of mercuric p-toluenethiosulfonate, two parts of the sodium salt of a copolymer from olefins and maleic anhydride prepared as a dispersing agent, and two parts of the mixture of an octylphenoxypolyethoxyethanol on magnesium carbonate. This composition was applied in a spray based on 1.5 pounds per 100 gallons and gave some control of late blight on potatoes. The particular value of this compound proved to be in control of scab on apple trees. It was used at two pounds per 100 gallons in a full spray schedule, pre-pink, bloom, petal fall, and four cover sprays to give exceptionally good control without any visible injury. Exceptional control was also obtained with a spray schedule consisting of three sprays at two pounds per 100 gallons of the above compound, pre-pink, bloom, and petal fall, followed by four cover sprays in which 1.5 pounds of zineb per 100 gallons was used. Results were at least equivalent to the best current treatments.

The zinc salts were also found to give good control of various common plant diseases. It was also found to be highly active against various soil organisms. For example, at 10 p. p. m. it prevented growth of *Pythium aphanidermatum* in standard tests. At 100 p. p. m. it controlled *Sclerotium rolfsii*, *Pythium ultimum*, and *Phytophthora citrophthora*. The value of soil applications in the environment of the plants on treatment of soil prior to seeding or setting out of plants is thus indicated.

Fairly good control of *Pythium ultimum* and *Sclerotinia sclerotiorum* was obtained with ferric salts of benzenethiosulfonic acids. The lead salts were effective against *Streptomyces scabies* even at 10 p. p. m.

We claim:

1. Salts of a metal from the group consisting of zinc, lead, mercury, and iron and an acid from the group consisting of benzenethiosulfonic, chlorobenzenethiosulfonic, and methylbenzenethiosulfonic acids.
2. Zinc p-toluenethiosulfonate.
3. Zinc p-chlorobenzenethiosulfonate.
4. Mercuric p-toluenethiosulfonate.
5. Lead p-toluenethiosulfonate.
6. Ferric p-toluenethiosulfonate.
7. A process for controlling fungi which comprises supplying to the environment of plants a salt of a metal from the group consisting of zinc, lead, mercury, and iron and an acid from the group consisting of benzenethiosulfonic, chlorobenzenethiosulfonic, and methylbenzenethiosulfonic acids, said salt being dispersed in a carrier therefor.
8. A process of controlling apple scab which comprises applying to apple trees a mercuric benzenethiosulfonate in a carrier therefor.

References Cited in the file of this patent

UNITED STATES PATENTS

| | | |
|---|---|---|
| 1,947,652 | Langdeijk | Feb. 20, 1934 |
| 2,215,457 | Andersen | Sept. 24, 1940 |
| 2,459,995 | Duncan et al. | Jan. 24, 1949 |
| 2,515,129 | Lieber et al. | July 11, 1950 |
| 2,528,902 | Moy et al. | Nov. 7, 1950 |
| 2,777,874 | Asseff et al. | Jan. 15, 1957 |